Jan. 9, 1968  T. L. BEACH, JR  3,362,597
SPARE TIRE AND WHEEL ASSEMBLY CARRIER DEVICE
Filed Oct. 31, 1966  4 Sheets-Sheet 1

INVENTOR
THEODORE L. BEACH JR.
*Frederick J. Taube*
ATTY

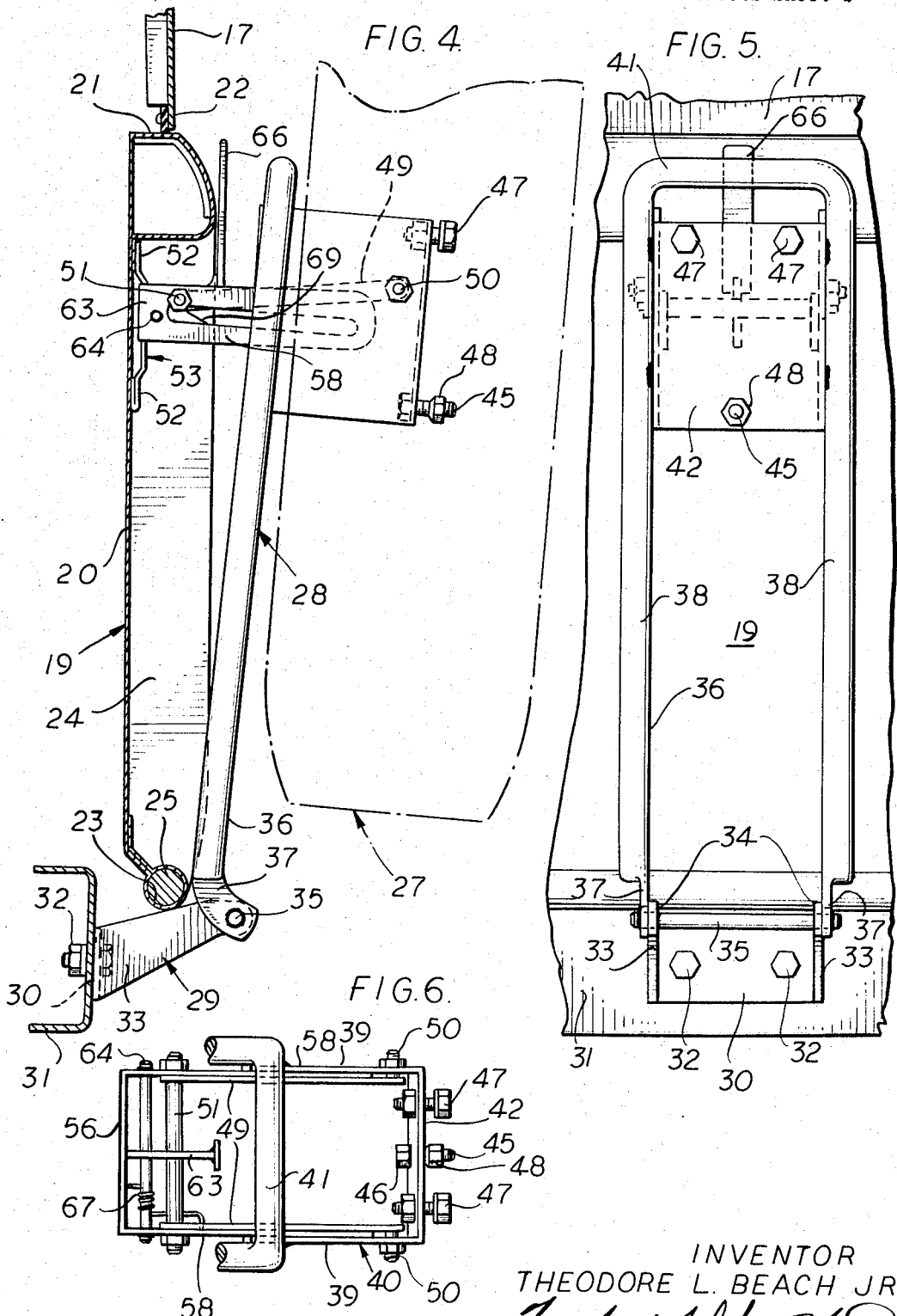

Jan. 9, 1968   T. L. BEACH, JR   3,362,597
SPARE TIRE AND WHEEL ASSEMBLY CARRIER DEVICE
Filed Oct. 31, 1966   4 Sheets-Sheet 3

INVENTOR
THEODORE L. BEACH JR.
*Frederick J. Kubel*
ATTY

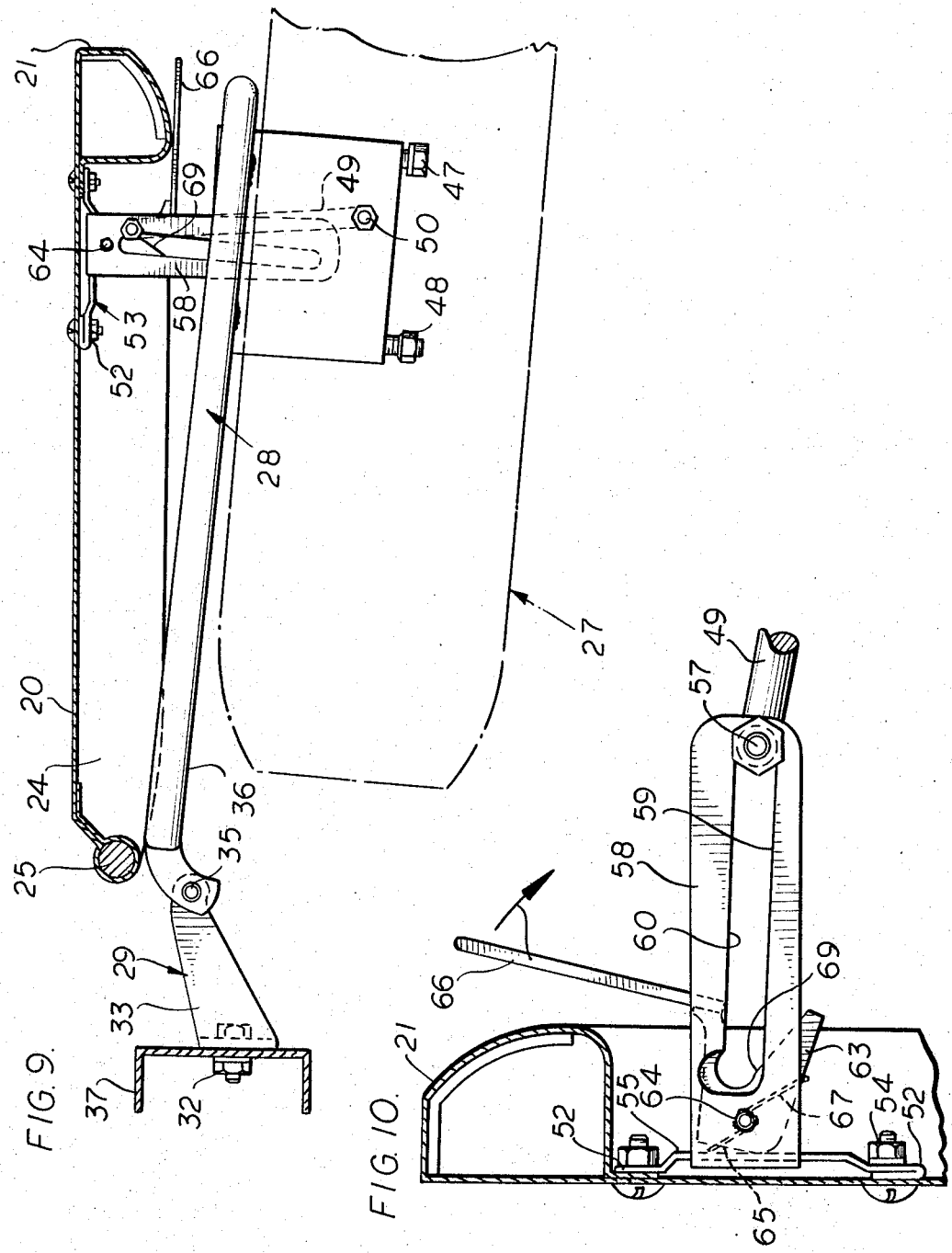

United States Patent Office 3,362,597
Patented Jan. 9, 1968

3,362,597
SPARE TIRE AND WHEEL ASSEMBLY
CARRIER DEVICE
Theodore L. Beach, Jr., Donnelsville, Ohio, assignor to International Harvester Company, Chicago, Ill., a corporation of Delaware
Filed Oct. 31, 1966, Ser. No. 590,786
10 Claims. (Cl. 224—42.21)

ABSTRACT OF THE DISCLOSURE

A spare tire and wheel assembly carrier device for a motor vehicle body of the station wagon type wherein the spare tire and wheel assembly is normally disposed exteriorly of the vehicle body adjacent the endgate with a portion thereof extending into the path of movement of an upper rear closure member when such member is swung between a closed and opened position. The spare tire and wheel carrier device is capable of being swung relatively to the endgate and upper closure member to a position wherein the spare tire and wheel assembly is out of the path of swinging movement of the upper closure member even though the endgate is in its closed position.

This invention relates to a new and improved spare tire and wheel assembly carrier device for motor vehicles, and, more particularly, to a new and improved spare tire and wheel assembly carrier construction for motor vehicle bodies of the station wagon type.

It is common practice in the manufacture of station wagon type motor vehicle bodies to provide an endgate structure for partially closing the open rear end of the body which endgate structure is capable of being swung about a laterally extending, generally horizontal axis from a vertical upright, closed position to a rearwardly extending, horizontally disposed, fully opened position wherein the endgate is in effect a horizontal continuation or extension of the motor vehicle body floor or bed. In many instances, the body of the motor vehicle of the station wagon type when provided with an endgate swingable about a transversely extending horizontal axis is also provided with an upper door or closure member which is also swingable between an opened position and a closed position about a transversely extending horizontal axis. The upper closure member and the endgate are designed in such a manner that when the upper door and endgate are in their closed positions the rear opening of the station wagon body is closed.

As is well known, it is customary in the operation of motor vehicles to have a spare tire and wheel assembly available for use in emergencies and thus storage means of some sort for carrying the spare tire and wheel assembly must be provided. In the case of station wagon type motor vehicles described above it has oftentimes been the practice to mount the spare tire and wheel assembly on the exterior of the endgate in order to conserve space and utilize the enclosed body space most efficiently to carry cargo and/or passengers. While storage of the spare tire and wheel assembly on the exterior of the endgate renders the same readily accessible and convenient for use and simultaneously affords maximum utilization of the cargo and passenger carrying space of the vehicle body, such spare tire and wheel assembly storage has presented the automotive body designer with wholly new problems. Because of the relative size of the spare tire and wheel assembly and the disposition of same on the endgate and in relation to the size and disposition of the upper closure door or member, the uppermost part of the spare tire and wheel assembly is disposed in the path of swinging movement of the closure member when the endgate is in its closed position so as to block the upper closure member or door and prevent it from being swung to its fully opened position. Inasmuch as the spare tire and wheel assembly is mounted directly on the endgate and is therefore movable in unison therewith, when the occasion arose when it was desired to open the upper closure member or door independently of and while leaving the endgate in its closed position, it was necessary heretofore to either lower the endgate to its fully opened position before the upper closure member was swung to its opened position or to lower the endgate just enough to permit the upper closure member to clear the spare tire and wheel assembly. Obviously the latter operation was extremely awkward to effect since the endgate and spare tire and wheel assembly had to be supported as the upper closure member was being swung to its fully opened position.

It is, therefore, an important objective of the present invention to avoid the aforementioned difficulties by providing a device by which a spare tire and wheel assembly may be stored in a generally upright position on the exterior of the endgate of a vehicle and in a position where the spare tire and wheel assembly is conveniently accessible for use which objective is partially achieved by providing means for supporting the carrier on the vehicle body in a novel manner whereby the spare tire and wheel assembly carrier and the spare tire and wheel assembly are movable in unison to a position with respect to the endgate wherein the uppermost part of the spare tire and wheel assembly is disposed without the path of swinging movement of the upper closure member and is supported in such position so the operator may easily open the upper closure member without the necessity of simultaneously supporting the endgate and spare tire wheel assembly or without first lowering the endgate to its fully opened position.

The foregoing and other important objects and desirable features inherent in and encompassed by the invention, together with many of the uses and purposes thereof, will become readily apparent from a reading of the ensuing description in conjunction with the annexed drawings, in which:

FIGURE 4 is a side elevational view of the spare tire and wheel assembly carrier in one position of adjustment, certain portions of the motor vehicle body, endgate and upper closure member are broken away to better illustrate the invention;

FIGURE 5 is a rear elevational view of the spare tire and wheel assembly carrier shown in FIGURE 4;

FIGURE 6 is a plan view of the spare tire and wheel assembly carrier;

FIGURE 9 is a view similar to FIGURE 4 with the exception that the endgate is shown in its fully opened position; and FIGURE 10 is a view similar to FIGURE 8 with the exception that the manually operable latch member is shown in its released position.

Figure 1:
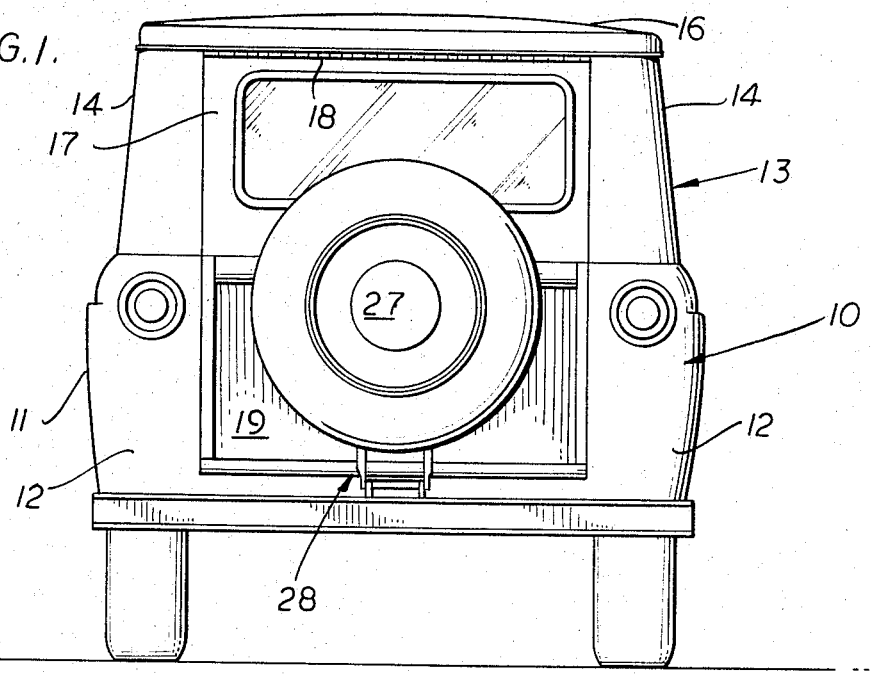
FIGURE 1 is a rear elevational view of a motor vehicle embodying the invention, the endgate and upper closure members being shown in their closed positions.

Referring to the drawings in detail, wherein like reference characters represent like elments throughout the various views, the rear portion of a pickup type motor truck body 10 is shown. The body 10 is generally illustrated as having a pair of laterally spaced, vertical side panels 11 which are suitably connected to a generally horizontal extending load supporting floor or bed (not shown). Rigidly fastened to or integrally formed with the rearwardmost end of each side panel 11 is a transversely extending rear panel section 12. The rear panel sections 12 are of a double wall construction and the juncture of the outer and inner panels of each rear panel section 12 is suitably reinforced and is formed to provide an offset portion having a generally inwardly facing surface extending vertically between the vehicle body floor and the top surface of the rear panel section. The transversely spaced offset portions of the rear panel section 12 define the transverse sides of an opening at the rear end of the body 10.

Figure 2:
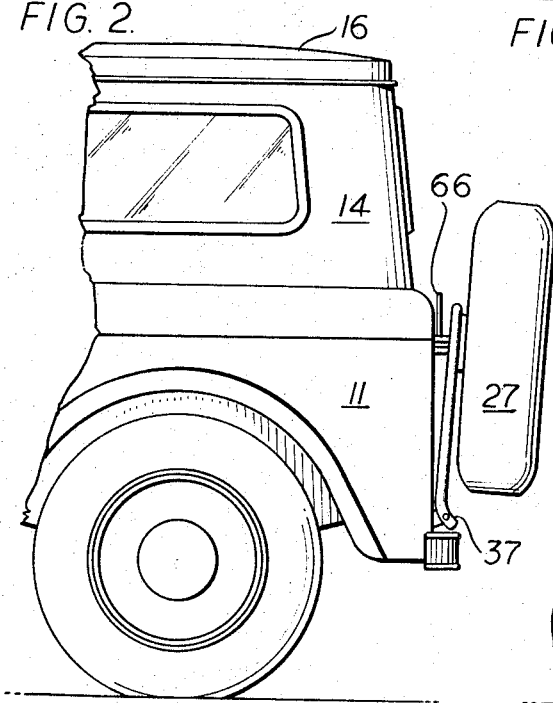
FIGURE 2 is a side elevational view of the rear end portion of the motor vehicle illustrated in FIGURE 1.
Figure 3:
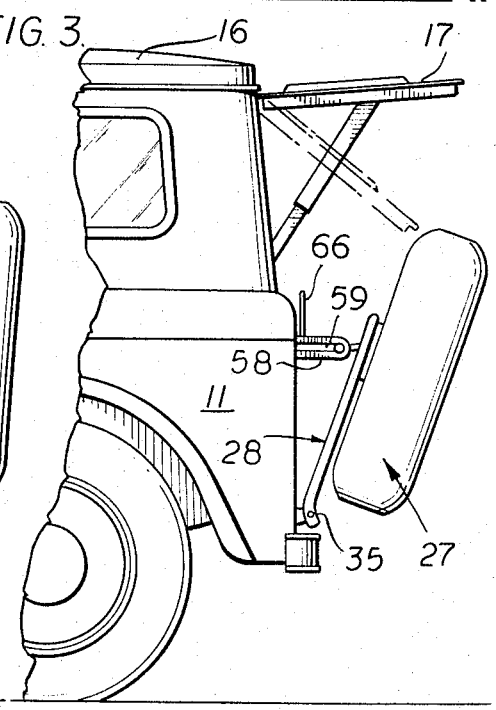
FIGURE 3 is a view similar to FIGURE 2 with the exception that the upper closure member is shown in its fully opened position and the spare tire and wheel assembly carrier is illustrated in a different position of adjustment.

As shown in FIGURES 1, 2 and 3, the motor vehicle body 10 includes an enclosure structure 13 which is preferably detachably mounted upon the side panels 11. The enclosure structure 13 includes a pair of transversely spaced, generally vertically side walls 14 and 15, the rearwardmost edge of each being mounted upon and suitably sealed and secured to the top surface of a respective side panel 11. A generally horizontal roof panel 16 extends between and is suitably connected to the side walls 14 and 15. The rear end of the enclosure structure 13 is open and is adapted to be closed by a generally rectangularly shaped closure member or door 17. Hinge means, designated generally by reference character 18, are provided for connecting the uppermost transversely extending edge of the closure member 17, as viewed in FIGURE 1, to the rearwardmost edge portion of the roof panel 16, the pivotal axis of the closure member 17 lying generally in a horizontal plane. The closure member 17 is swingable between a fully closed position, illustrated in FIGURES 1 and 2, wherein the rear opening in the enclosure structure 13 is closed and the closure member 17 is disposed substantially vertically and a fully opened position, illustrated in FIGURE 3, wherein the closure member 17 extends generally rearwardly and horizontally from the rear edge of the roof panel 16.

Preferably the endgate, designated generally by reference character 19, includes a single metal sheet 20 having a generally rectangular shape. The metal sheet 20 may be provided with suitable depressions or ribs (not shown) which serve to strengthen and rigidify the endgate structure. The metal sheet 20 is formed to provide a transversely extending box-like section, the top surface 21 of which is substantially in horizontal alignment with the top surfaces of the rear panel sections 12 when the endgate 19 is in its closed position as shown in FIGURE 1. It will also be noted that the transversely extending edge of the closure member 17 spaced and parallel to the hinge means 18 is provided with a projecting flange 22 which is adapted to overlap and operably engage the transversely extending box-like section of the endgate 19 when the endgate 19 and closure member 17 are in their fully closed positions as shown in FIGURE 4. It is to be understood that suitable weather stripping means (partially shown in FIGURE 4) are provided for sealing the rear opening in the vehicle body when the endgate 19 and the closure member 17 are in their closed positions. The normally lower edge of the metal sheet 20 is rolled to provide an opened-ended cylindrical bearing 23. Rigidly attached as by welding to each lateral edge of the metal sheet 20 is a plate-like end member 24. A pivot pin support bracket (not shown) is fastened to each inwardly facing end surface of a rear panel section offset portion adjacent the level of the floor or bed of the truck body 10. Projecting transversely inwardly from the lower end of each support bracket is a cylindrical pivot pin 25 which is integrally formed with or rigidly carried by the bracket and is adapted to project into a respective end of the cylindrical bearing 23. In this manner the endgate is pivotally supported by the body 10 and is swingable about a transversely extending, horizontal axis through the pivot pins 25 disposed adjacent the level of the floor or bed between a fully closed, generally upright vertical position, shown in FIGURE 1, and an opened position wherein the endgate 19 extends horizontally rearwardly, as shown in FIGURE 9. The pivotal axis of the endgate 19 is substantially parallel to the pivotal axis of the closure member 17. Suitable support means in the form of a pair of articulated links or the like (not shown) are provided on each side of the endgate for supporting the endgate 19 in its fully opened position. The constructional details of the articulated links disposed on each side of the endgate 19 form no part of the present invention and therefore are not shown. However, it is to be understood that other forms of support means such as chains, cables, etc., could be utilized without departing from the spirit and scope of the invention.

As best shown in FIGURES 1, 2 and 3, the spare tire and wheel assembly, designated generally by reference character 27, is positioned on the exterior of the endgate 19 so as to be readily available for use in emergencies and to conserve and utilize the space within the body 10 most efficiently. The spare tire and wheel assembly carrier 28 utilized in the present invention for mounting the spare tire and wheel assembly 27 on the vehicle body 10 includes a substantially U-shaped bracket 29 which has its bight portion rigidly secured to the web 30 of a channel shaped, transversely extending body cross member 31 by means of nuts and bolts 32. As clearly shown in FIGURE 4, the spaced and parallel legs 33 of the U-shaped bracket 29 project rearwardly from the body cross member 31 and extend below the pivot pins 25 of the endgate 19. The free ends 34 of the bracket legs 33 are disposed rearwardly of the pivot pins 25 and carry a pivot shaft 35, the longitudinal axis of the pivot shaft 35 being spaced and parallel with respect to the pivotal axis of the endgate 19. As shown in FIGURE 1, the bracket 29 is fastened to the body cross member 32 substantially midway between its ends so that the spare tire and wheel assembly 27 will be substantially centered on the endgate 19, as viewed from the rear of the motor vehicle, during normal operation of the vehicle.

The spare tire and wheel assembly carrier 28 also includes a substantially U-shaped frame 36 which is preferably made of tubular material. The free ends 37 of the frame legs 38 are flattened and each end 37 is rigidly secured to respective end of the pivot shaft 35. As best shown in FIGURES 4, 5 and 6, the plate-like legs 39 of a substantially channel shaped mounting bracket 40 are disposed between the tubular legs 38 of the U-shaped frame 36 adjacent the bight portion 41 thereof and each plate-like leg 39 is rigidly secured to the adjacent frame leg 38 by welding or the like. The plate-like web portion 42 of the mounting bracket 40 is provided with a plurality of apertures therethrough. A plurality of nuts 43 are welded to the inner face of the bracket web portion 42, each nut 43 being in alignment with a respective aperture. Two horizontally spaced nuts 43 are shown but it is to be understood that a greater or less number of nuts and having different spacing than the spacing of the nuts 43 illustrated could be employed without departing from the spirit and scope of the invention. The threaded shank portion 44 of a stud 45 extends through an aperture vertically below and horizontally spaced between the nuts 43. The head 46 of the stud 45 is welded to the inner face of the bracket web 42. The spare tire and wheel assembly 27 is detachably connected to the bracket 40 by registering two of the usual stud-receiving apertures of the vehicle spare wheel with the two bracket apertures provided with the nuts 43 and inserting the stud 45 through another of the wheel stud-receiving apertures. Thereafter, studs 47 are threaded into the nuts 43 and a lug nut 48 is threaded on the stud 45 for detachably securing the spare tire and wheel assembly 27 on the bracket 40.

As best shown in FIGURE 6, the spare tire and wheel assembly 27 includes a pair of elongated arms 49, each of which has one end pivotally connected to a respective one of the bracket legs 39 adjacent the web portion 42 by means of a pivot pin 50. The pivot pins 50 are in transverse and horizontal alignment. The end of each arm 49 opposite the end pivotally connected to the bracket 40 is rigidly connected to a respective end of a generally cylindrical latch bolt 51. The purpose of the latch bolt 51 and the manner in which it operates will be pointed out hereinafter.

Figure 7:
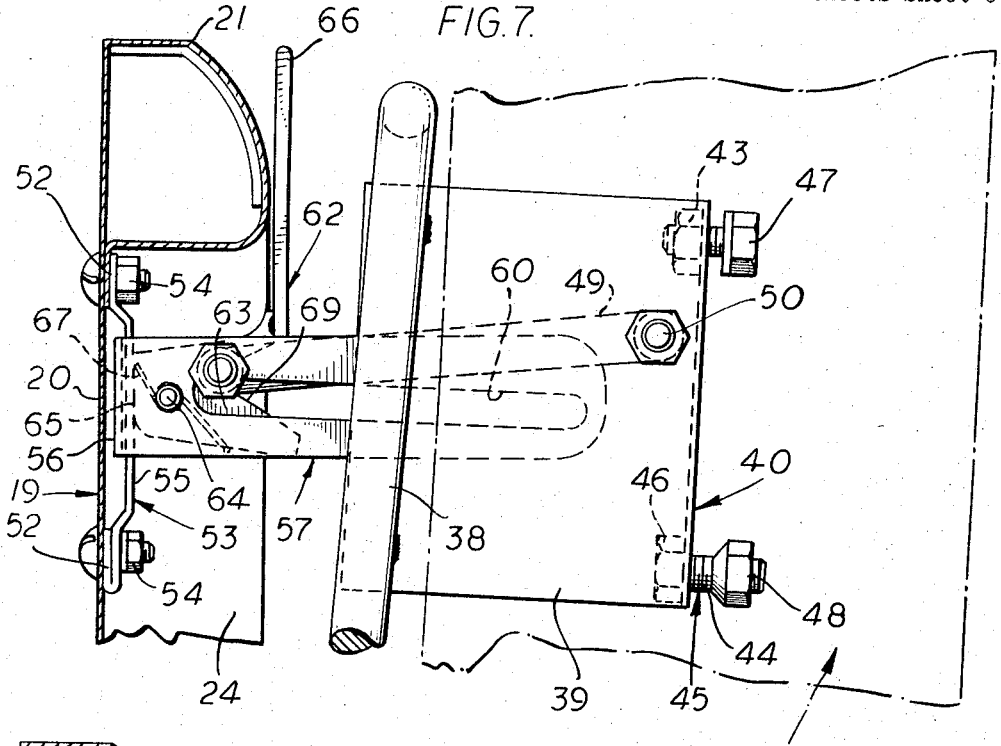
FIGURE 7 is an enlarged fragmentary side elevational view of the spare tire and wheel assembly carrier structure for releasably locking the carrier in one position of adjustment on the endgate.
Figure 8:
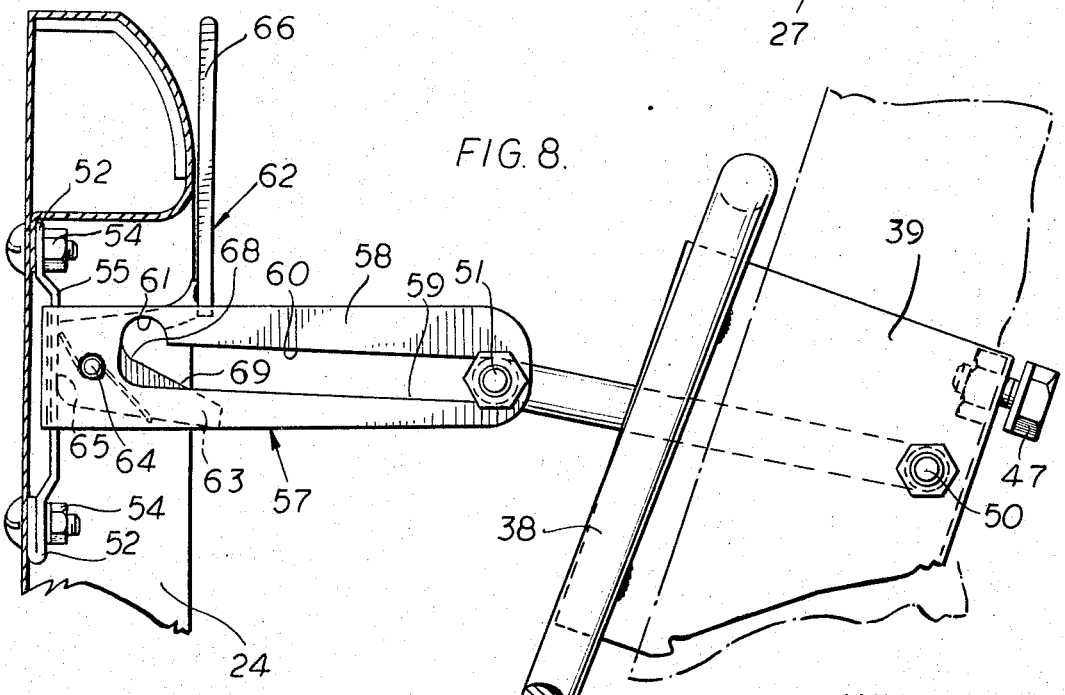
FIGURE 8 is a view similar to FIGURE 7 showing the relative positions assumed by certain parts of the carrier structure when the carrier structure is in a different position of adjustment with respect to the endgate.

Referring to FIGURES 7 and 8, it will be noted that the transversely extending, substantially parallel edge portion 52 of a mounting plate 53 are rigidly secured to the endgate 19 just below the box-like section thereof by means of nut and bolt sets, designated generally by reference character 54. As clearly shown, the mounting plate 53 is provided with an offset portion 55 spaced from the general plane of the endgate 19. The bight portion 56 of a substantially U-shaped member 57 extends between the metal sheet 20 and the offset portion 55 and is rigidly secured to the inwardly facing surface of the offset portion 55 by welding or the like. As illustrated in FIGURES 6 and 7, the legs 58 of the U-shaped member 57 extend rearwardly and substantially horizontally from the endgate 19 when the endgate is in its closed position. Each leg 58 is adjacent to a respective leg 39 of the mounting bracket 40 and is provided with an elongated slot 59 therethrough, the slots 59 of the legs 39 being coextensive and in transverse alignment. The slots 59 have a width slightly greater than the diameter of the latch bolt 51. As best illustrated in FIGURE 6, the arms 49, carrying the latch bolt 51 are spaced a transverse distance less than the transverse spacing of the legs 58 of the U-shaped member 57 and, consequently, the arms 49 and the latch bolt 51 are capable of swinging with respect to the legs 58 of the U-shaped member 57 about an axis extending through the transversely aligned pivot pins 50. Each end portion of the latch bolt 51 extends through a respective leg 58. As best shown in FIGURE 8, the end portion closest to the endgate 19 of the uppermost longitudinal edge 60 partially defining each slot 59 has a generally semi-circular recess 61 opening therein, the radii of curvature of the recesses 61 being slightly larger than the diameter of the latch bolt 51. The recesses 61 serve as latch keeper pocket means for receiving the end portions of the latch bolt 51 when the spare tire and wheel assembly 57 is in its normal position on the motor vehicle body 10 with respect to the endgate 19. As is apparent from FIGURE 7, the longitudinal axis of the latch bolt 51 is substantially normal to and spaced with respect to the longitudinal axes of the elongated slots 59 when the latch bolt 51 is in engagement with the latch keeper pocket means.

In order to prevent removal of the latch bolt 51 from the latch keeper pocket means and to lock the spare tire and wheel assembly 27 in its normal position with respect to the endgate 19, a manually operable latch member 62 is provided. Latch member 62 includes a generally vertically disposed plate-like body 63 through which a transversely extending pivot pin extends. The ends of the pivot pin 64 are welded or otherwise suitably secured to the legs 58 of the U-shaped member 57 adjacent to the bight portion 56. The latch member body 63 is formed with a flat edge section 65 which abuts the outwardly facing side of the offset portion 55 of the mounting plate 53 when the latch member 62 is in its locked position. Thus, the offset portion 55 functions as stop means for limiting pivotal movement of the latch member 62 in one direction and establishes the position of the latch member 62 when in its locking position. The latch member 62 which is pivotally supported by the pivot pin 64 substantially midway between the ends of the pin 64 is capable of being moved from its locking position, illustrated in FIGURE 7, to its unlocking or releasing position, shown in FIGURE 8, and to facilitate such movement an operating lever 66 in the form of an elongated bar is provided. One end of the operating lever 66 is welded or otherwise suitably secured to the latch member body 63 and is oriented in such a manner that it extends substantially vertically and terminates in the vicinity of the box-like section of the endgate 19 when the latch member 62 is in locking position so as to be conveniently accessible for manipulation. Biasing means in the form of a torsion spring 67 mounted on the pivot pin 64 is provided for yieldably urging the latch member 62 toward its locking position with the flat straight edge section 65 of the body 63 in abutting engagement with the mounting plate offset portion 55. The torsion spring 67 illustrated has one leg reacting against the offset portion 55 and its opposite leg hooked under and engaging the lowermost edge of the latch member body 63, as viewed in FIGURE 7. It is to be understood, the biasing means described in detail per se forms no part of the present invention and other forms and constructions of springs could be utilized for yieldably urging the latch member 62 to its locking position without departing from the spirit and scope of the invention. The rearwardmost edge of the latch member body 63, as viewed in FIGURE 7, is formed to provide a substantially semi-circular surface 78 which has a radius of curvature slightly greater than the radius of the latch bolt 51 and substantially equal to the radii of curvature of the recesses 61. Extending rearwardly and downwardly from one end of the semi-circular surface 68 is a relatively straight edge ramp section 69. From the foregoing, it will be appreciated that when the latch member is in its locked position the ramp section 69 is disposed in the path of the latch bolt 51 as the latch bolt slides longitudinally in the slots 59 from the position shown in FIGURE 8 toward the position shown in FIGURE 7. It will also be appreciated that as the tire and wheel assembly 27 is swung from the position shown in FIGURE 3 towards its normal position illustrated in FIGURE 2, the latch bolt 51 engages the ramp section 69 of the latch member 52 and the latch member 62 is caused to rotate about the axis of the pivot pin 64 against the resilient action of the spring 67 to the position shown in FIGURE 10. When the latch member 62 is in this position which corresponds to its releasing position the end portions of the latch bolt 51 are permitted to enter the recesses 61 and since the latch bolt 51 is capable of swinging out of the slots 59 and into the recesses 61 because of the pivotal connection of the latch bolt supporting arms 49 with the bracket 40 by means of the pivot pins 50, the spring 67 is effective to automatically cause the latch bolt ends to be positioned in the recesses 61 immediately upon the latch bolt 51 moving out of engagement with the ramp section 69 and into a posiiton wherein it is partially encircled by the semicircular latch member surface 68. It will be appreciated that when the latch bolt 51 is in the position as shown in FIGURE 4 wherein the ends of the latch bolt 51 are disposed in the recesses 61 and the latch member 62 is in its locking position, the latch bolt 51 is prevented from moving from the recesses 61 to the slots 59 and such locking position is maintained by the spring 67. However, when it is desired to permit the latch bolt 51 to slide longitudinally along the slots 59 to the position illustrated in FIGURE 8, the operator merely grasps the operating lever 66 and rocks the latch member 62 in a clockwise direction, as viewed in FIGURE 7, about the axis of the pivot pin 64 against the resilient action of the spring 67 to the position shown in FIGURE 10. It will be appreciated that during movement of the latch member 62 from its locking position to its releasing position the latch bolt 51 is in effect cammed downwardly out of engagement with recesses 61 and into the slots 59. Inasmuch as the semi-circular surface 68 is no longer in blocking engagement with the latch bolt when the latch member 62 is in its releasing position, the latch bolt 51 may freely move longitudinally with respect to the legs 58 by sliding in the slots 59.

From the foregoing it is believed the operation and the manner in which the spare tire and wheel assembly carrier 28 is used is obvious. During regular operation of the vehicle, the closure member 17 and endgate 19 are usually in their closed positions, as illustrated in FIGURES 1 and 2. The spare tire and wheel assembly 27 and the carrier 28 are also usually in their normal positions wherein the spare tire and wheel assembly 27 is disposed in a generally vertical upright manner. When the carrier 28 is in its normal position, the latch bolt 51 is disposed in the latch keeper pocket means and is maintained in such position by the manually operable latch member 62, as pointed out hereinbefore. It will also be appreciated that when the spare tire and wheel assembly 27 is in its normal, generally upright position exteriorly of the endgate 19, the uppermost part of the spare tire and wheel assembly is disposed in the path of swinging movement of the closure member 17 because of the relative size of the spare tire and wheel assembly 27 and the disposition of same on the endgate 19 and in relation to the size and disposition of the upper closure member 17. Thus, when it is desired to open the upper closure member 17 independently of and while leaving the endgate 19 in its closed position, the operator merely rocks the latch member 62 to its released position against the biasing action of the spring 67 to permit the carrier frame 36 to swing with respect to the endgate 19 about the pivotal axis extending through the pivot shaft 35. Obviously, as the frame 36 swings relatively to the endgate in this manner, the latch bolt 51 slides longitudinally with respect to the legs 58 in the slots 59. Further relative pivotal movement of the frame 36 is prevented when the latch bolt 51 reaches the ends of the slots 59 remote from the recesses 61. Inasmuch as the spare tire and wheel assembly 27 is mounted on the frame 36 so as to be movable therewith when the frame 36 is in its outwardly swung position, the uppermost portion of the spare tire and wheel assembly 27 is out of the path of swinging movement of the closure member 17. It will also be appreciated that the spare tire and wheel assembly 27 is supported by the body structure and endgate 19 when in this outwardly swung position without any effort on the part of the operator so as to permit the operator to manipulate the upper closure member 17 with a minimum of difficulty.

The embodiment of the invention chosen for the purposes of illustration and description herein is that preferred for achieving the objects of the invention and developing the utility thereof in the most desirable mannner, due regard being had to existing factors of economy, simplicity of design and construction, and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. In a motor vehicle body structure having a rear opening, an endgate pivotally connected to said body structure for swinging movement about a horizontal axis extending transversely of the body structure through one edge of said endgate between a generally vertical upright, closed position and a generally horizontal, opened position, and an upper closure member pivotally connected to said body structure for swinging movement about a horizontal axis extending transversely of the body structure through one edge of said closure member between a generally vertical, closed position and a generally horizontal, rearwardly extending fully opened position, the pivotal axes of said closure member and said endgate being vertically spaced apart and substantially parallel, said closure member and said endgate having transversely extending edges in operative engagement with each other and being effective to close said rear opening of said body structure when in their closed positions, the combination including said body structure, endgate and closure member comprising, a spare tire and wheel assembly; and spare tire and wheel assembly carrier means for supporting said spare tire and wheel assembly exteriorly of said endgate, said carrier means positioning said spare tire and wheel assembly in a normal position with respect to said endgate wherein said spare tire and wheel assembly is generally vertically oriented and an uppermost portion thereof is disposed above the uppermost edge of said endgate when in its closed position and in the path of swinging movement of said closure member when said closure member is swung between its closed and fully opened positions, said carrier means being swingable in unison with said endgate when said endgate is swung between its opened and closed positions, said carrier means including selectively adjustable means for positioning said spare tire and wheel assembly in a second position with respect to said endgate wherein said spare tire and wheel assembly is out of path of swinging movement of said closure member while said endgate remains in its closed position.

2. In a motor vehicle body structure as set forth in claim 1, wherein said spare tire and wheel assembly is spaced substantially midway between the transverse ends of said endgate, and said spare tire and wheel assembly carrier means includes a frame pivotally connected to said body structure, said frame being swingable in unison with said endgate as well as being swingable with respect to said endgate while said endgate remains in its closed position between a normal position corresponding to the normal position of said spare tire and wheel assembly and a second position corresponding to the second position of the spare tire and wheel assembly.

3. In a motor vehicle body structure as set forth in claim 2, wherein the pivotal axis of said frame is substantially parallel and adjacent to and rearwardly spaced from the pivotal axis of said endgate.

4. In a motor vehicle body structure as set forth in claim 3, wherein said pivotal axis of said frame extends through one end thereof and carrier means includes a mounting bracket fixedly secured to said frame adjacent the end thereof opposite said one end and swingable in unison therewith, said mounting bracket including a generally flat plate-like portion; and means for detachably connecting said spare tire and wheel assembly to said mounting bracket plate-like portion.

5. In a motor vehicle body structure as set forth in claim 4, including releasable lock means supported by said endgate, said releasable lock means being operatively engageable with said frame for locking said frame in its normal position with respect to said endgate.

6. In a motor vehicle body structure having a rear openinng, an endgate pivotally connected to said body structure for swinging movement about a horizontal axis extending transversely of the body structure through one edge of said endgate between a generally vertical upright, closed position and a generally horizontal, opened position, and an upper closure member pivotally connected to said body structure for swinging movement about a horizontal axis extending transversely of the body structure for swinging movement through one edge of said closure member between a generally vertical, closed position and a generally horizontal, rearwardly extending fully opened position, the pivotal axes of said closure member and said endgate being vertically spaced apart and substantially parallel, said closure member and said endgate having transversely extending edges in operative engagement with each other and being effective to close said rear opening of said body structure when in their closed positions, the combination including said body structure, endgate, and closure member comprising, a spare tire and wheel assembly; spare tire and wheel assembly carrier means for supporting said spare tire and wheel assembly exteriorly of said endgate substantially midway between the transverse ends thereof, said carrier means positioning said spare tire and wheel assembly in a normal position with respect to said endgate wherein said spare tire and wheel assembly is generally vertically oriented when said endgate is in its closed position with an uppermost portion thereof disposed above the uppermost edge of said endgate and in the path of swinging movement of said closure member when said closure member is swung between its closed and fully opened positions, said spare tire and wheel assembly carrier means including a frame having one end connected to said body structure for pivotal movement about an axis substantially parallel and adjacent to and rearwardly spaced from the pivotal axis of said endgate, said carrier means including a mounting bracket fixedly secured to said frame adjacent the end opposite said end pivotally connected to said body structure, said mounting bracket being swingable in unison with said frame and including a generally flat plate-like portion, said carrier means further including releasable lock means supported by said endgate, said releasable lock means being operably engageable with said frame for locking said frame in its normal position with respect to said endgate and including a rod-like latch bolt swingable in unison with said frame as said frame swings between its normal and second positions and means for detachably connecting said spare tire and wheel assembly to said mounting bracket plate-like portion.

7. In a motor vehicle body structure as set forth in claim 6, wherein said releasable latch means included latch keeper pocket means fixed with respect to said endgate for receiving and engaging said latch bolt therein when said frame is in its normal position; and a manually operable latch member movable between a locked position wherein an edge portion thereof engages said latch bolt and prevents removal of said latch bolt from said pocket means and a released position wherein said latch member edge portion is moved out of engagement with said latch bolt so as to permit removal thereof from said pocket means.

8. In a motor vehicle body structure as set forth in claim 7, wherein said releasable latch means includes biasing means yieldably urging said latch member toward its locked position.

9. In a motor vehicle body structure as set forth in claim 8, wherein said releasable latch means includes a generally U-shaped member having the bight portion thereof rigidly secured to said endgate with the legs thereof extending rearwardly and substantially horizontally when said endgate is in its closed position, each of said legs being provided with an elongated slot therethrough, said slots being in transverse alignment, said latch bolt extending transversely through said legs and being slidable in said slots, said frame being in its second position when said latch bolt is at a respective end of each of said slots.

10. In a motor vehicle body structure as set forth in claim 9, wherein said latch keeper pocket means includes a recess in each of said legs of said U-shaped member, each of said recesses opening into a respective slot, the longitudinal axis of said latch bolt when said latch bolt is disposed in said recesses extending substantially normally to and spaced from the longitudinal axes of said slots, said latch member edge portion engaging said latch bolt and preventing removal of said latch bolt from said recesses when said latch member is in its locked position and said latch bolt is disposed in said recesses.

References Cited

UNITED STATES PATENTS 2,805,807   9/1957   Slack _____ 224—42.21

FOREIGN PATENTS 1,092,433   11/1954   France.

HUGO O. SCHULZ, *Primary Examiner.*